(12) United States Patent
Dezon-Gaillard et al.

(10) Patent No.: US 9,296,139 B2
(45) Date of Patent: Mar. 29, 2016

(54) MULTI-PROPERTY INJECTION MOLDING NOZZLE

(71) Applicant: Husky Injection Molding Systems Ltd., Bolton (CA)

(72) Inventors: Patrice Fabien Dezon-Gaillard, Jericho, VT (US); Sami Samuel Arsan, Mississauga (CA)

(73) Assignee: Husky Injection MOLDING SYSTEMS LTD., Bolton, Ontario (CA)

(*) Notice: Subject to any disclaimer, the term of this patent is extended or adjusted under 35 U.S.C. 154(b) by 0 days.

(21) Appl. No.: 14/402,369

(22) PCT Filed: Jun. 13, 2013

(86) PCT No.: PCT/US2013/045591
§ 371 (c)(1),
(2) Date: Nov. 20, 2014

(87) PCT Pub. No.: WO2013/188634
PCT Pub. Date: Dec. 19, 2013

(65) Prior Publication Data
US 2015/0110918 A1    Apr. 23, 2015

Related U.S. Application Data

(60) Provisional application No. 61/660,079, filed on Jun. 15, 2012.

(51) Int. Cl.
*B29C 45/20* (2006.01)
*B29C 45/27* (2006.01)
*B23P 15/00* (2006.01)
*B29C 45/28* (2006.01)
*B29L 31/00* (2006.01)

(52) U.S. Cl.
CPC .............. *B29C 45/20* (2013.01); *B23P 15/007* (2013.01); *B29C 45/27* (2013.01); *B29C 45/2806* (2013.01); *B29L 2031/757* (2013.01); *Y10T 29/49826* (2015.01)

(58) Field of Classification Search
CPC ........................... B29C 45/27; B29C 45/2806
USPC .................................................. 425/549, 564
See application file for complete search history.

(56) References Cited

U.S. PATENT DOCUMENTS

| 6,382,528 | B1 * | 5/2002 | Bouti ............................. 239/489 |
| 6,609,902 | B1 * | 8/2003 | Blais et al. .................... 425/549 |
| 7,131,832 | B2 | 11/2006 | Babin |
| 7,270,538 | B2 | 9/2007 | Sicilia |
| 7,507,081 | B2 | 3/2009 | Guenther et al. |
| 2002/0143207 | A1 | 10/2002 | Cuthbertson |

* cited by examiner

OTHER PUBLICATIONS

International Search Report 3 pages.

*Primary Examiner* — Tim Heitbrink (57) ABSTRACT

Injection-molding nozzles having any one or more of improved heat transfer, wear resistance, and melt transfer from a manifold to a mold. The operation and durability of a nozzle can be improved by integrally layering multiple materials to create a multi-property nozzle that is a unitary, monolithic, and seamless structure. For example, the heat transfer properties of a nozzle is improved by integrally layering certain materials in the nozzle housing such that heat is more effectively dissipated or transferred throughout the nozzle to maintain and promote melt flow. One or more components of the nozzle can be merged and thus seamlessly formed to improve melt flow by reducing joints that would cause the melt to hang up within the nozzle and, concomitantly, reducing manufacturing and assembly time. The process used to unitarily form some or all of the nozzle may also be used to create complex geometric configurations therein.

6 Claims, 7 Drawing Sheets

MULTI-PROPERTY INJECTION MOLDING NOZZLE

FIELD OF THE INVENTION

The present invention generally relates to the field of injection molding machines. In particular, the present invention is directed to a multi-property injection molding nozzle.

BACKGROUND

Injection molding machine nozzles assist in repeatedly delivering molten plastic from a heated manifold to a mold at high temperatures and pressures so as to create molded parts of various configurations.

SUMMARY OF THE DISCLOSURE

According to one aspect, disclosed is an injection molding nozzle assembly comprising: a nozzle body, the nozzle body partially defining a melt channel; a first material having a first characteristic, wherein the first material is disposed on a periphery of said melt channel; and a second material having a second characteristic, wherein said second material is disposed radially outward from said first material, wherein said first material and said second material are integrally fused together so as to form a unitary structure. According to another aspect, disclosed is an injection molding nozzle comprising: a nozzle body; and at least one of a nozzle tip and a sealing member, wherein said nozzle body and said at least one of a nozzle tip and a sealing member are integrally fused to form a seamless unitary monolithic structure.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Ideally, injection molding nozzles maintain the temperature of the molten plastic throughout the length of the nozzle, provide a channel of uninterrupted flow of molten plastic to the mold, and, as necessary for many plastic products, consistently deliver the melt to the mold such that vestiges on the surface of the molded part are practically non-existent.

Because nozzles are made from multiple discrete components, consistently delivering on the above mentioned criteria is a challenge because the components may wear inconsistently, transfer heat disparately and thus ineffectively, and have to be fitted together precisely so as to inhibit non-continuous flow within the channel at junction points between nozzle components and to fit securely within the rest of the injection molding machine. Moreover some molded parts require the mixing of molten plastics or additives with the mixing being completed within the nozzle. Creating these types of complex geometries (and others) within a nozzle that meets design and performance requirements is complicated or impossible using current manufacturing techniques and often results in sub-optimal nozzles.

An injection molding nozzle according to the present disclosure provides for, among other things, improved heat transfer, wear resistance, and melt transfer from a manifold to the mold. As explained in more detail below, the operation and durability of all, or a portion of, the nozzle can be improved by integrally layering materials to as to create a multi-property nozzle that is a unitary structure. For example, the heat transfer properties of the nozzle may be improved by integrally layering materials in the nozzle housing such that heat may be more effectively dissipated or transferred throughout the nozzle to maintain and promote melt flow. Various materials may also be integrally formed to improve wear resistance at the nozzle tip, at the nozzle housing, or at other contact points within the nozzle. Moreover, one or more of the components of the nozzle may be merged and thus unitarily formed so as to improve melt flow by reducing joints that would cause the melt to hang up within the nozzle and, concomitantly reducing manufacturing and assembly time. The process used to unitarily form some or all of the nozzle may also be used to create complex geometric configurations within the nozzle.

Figure 1:
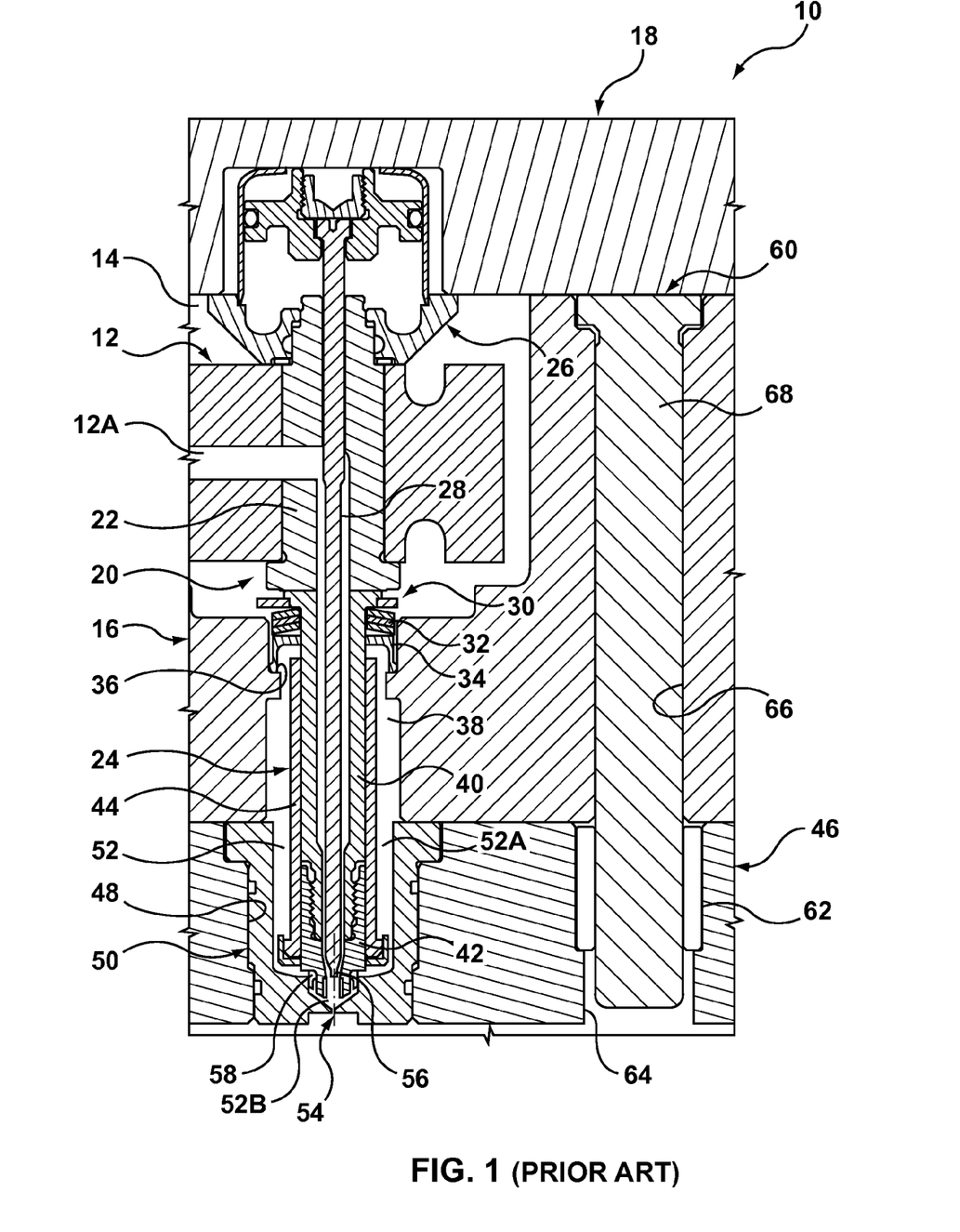
FIG. 1 is a perspective view of a portion of a prior art injection molding machine including a nozzle.

The injection nozzles of the present disclosure may be best understood by contrasting it to prior art injection molding nozzles (such as nozzle portion 24 shown in FIG. 1 and discussed below) used within an exemplary hot runner system, such as hot runner system 10 of FIG. 1. Hot runner 10 includes a hot-runner manifold 12, which is located within a manifold cavity 14 defined by a manifold plate 16 and a backing plate 18. As those skilled in the art know, manifold 12 is movably mounted within cavity 14 to accommodate the thermal expansion differential that occurs between the manifold and other components, such as manifold plate 16 and backing plate 18, during use of hot runner 10 for injecting one or more molten materials (not shown) into one or more mold cavities of a mold (not shown).

Hot runner 10 also includes a nozzle stack 20 that intermittently delivers the molten material(s) from one or more channels 12A within manifold 12 to the mold. Generally, nozzle stack 20 may be considered to include a manifold portion 22, a nozzle portion 24, an actuator portion 26, and a valve stem 28 that extends from the actuator portion to the nozzle portion. Manifold portion 22 of nozzle stack 20 is movable with the rest of manifold 12 as the manifold thermally expands and contracts relative to manifold plate 16 and nozzle portion 24 of the nozzle stack. To accommodate the relative movement, nozzle portion 24 is biased into sliding engagement with manifold portion 22 using a spring arrangement 30 that includes a spring 32 that works against a nozzle locator 34 that in turn is seated on a shoulder 36 formed within a nozzle cavity 38 of manifold plate 16. Nozzle portion 24 includes a main nozzle body 40, a nozzle tip 42 threadedly engaged with the main nozzle body, and a heater sleeve 44 surrounding the main nozzle body and a portion of the nozzle tip. Those skilled in the art will readily appreciate that while a single nozzle stack 20 is shown, a typical injection-molding apparatus of the sort illustrated in FIG. 1 will have more than one nozzle stack.

Hot runner 10 further includes a cavity plate 46 that forms part of the mold. Cavity plate 46 includes a cavity 48 into which a gate insert 50 is installed. Gate insert 50 defines a nozzle cavity 52 that receives part of nozzle portion 24 and includes a gate orifice 54 through which the molten material(s) flow during injection molding operations. As those skilled in the art will know, valve stem 28 has a tip 56 configured to engage gate orifice 54 with a very close fit. As shown in FIG. 1, nozzle cavity 52 has a first portion 52A of a relatively larger diameter to accommodate heater sleeve 44 and other components, and a second portion of a relatively smaller diameter for snugly receiving a spacer ring 58 that is secured to nozzle tip 42.

Manifold plate 16 is aligned with cavity plate 46 via a plurality of guide-pin arrangements 60, one of which is shown in FIG. 1. Each guide-pin arrangement 60 includes a guide bushing 62 snugly engaged within an aperture 64 in cavity plate 46, an aperture 66 in manifold plate 16, and a guide pin 68 snugly engaged within aperture 66 and bushing 62. With the conventional arrangement shown, those skilled in the art will readily appreciate that the alignment of nozzle tip 56 within gate orifice 54 when valve stem 28 is in its gate-closed position (not shown) is effectively established by nozzle locator 34 and spacer ring 58 and the precision of the locations of the various components of guide-pin arrangements 60 and the precision of the locations of the various features of nozzle cavity 30 in manifold plate 16, as well as the second portion 52B of nozzle cavity 52 in gate insert 50. Those skilled in the art will also readily understand that these locations are subject to precision tolerances and that such tolerances are additive from gate orifice 54, through guide-pin arrangement 60 and to nozzle locator 34 in manifold plate 16.

Figure 2:
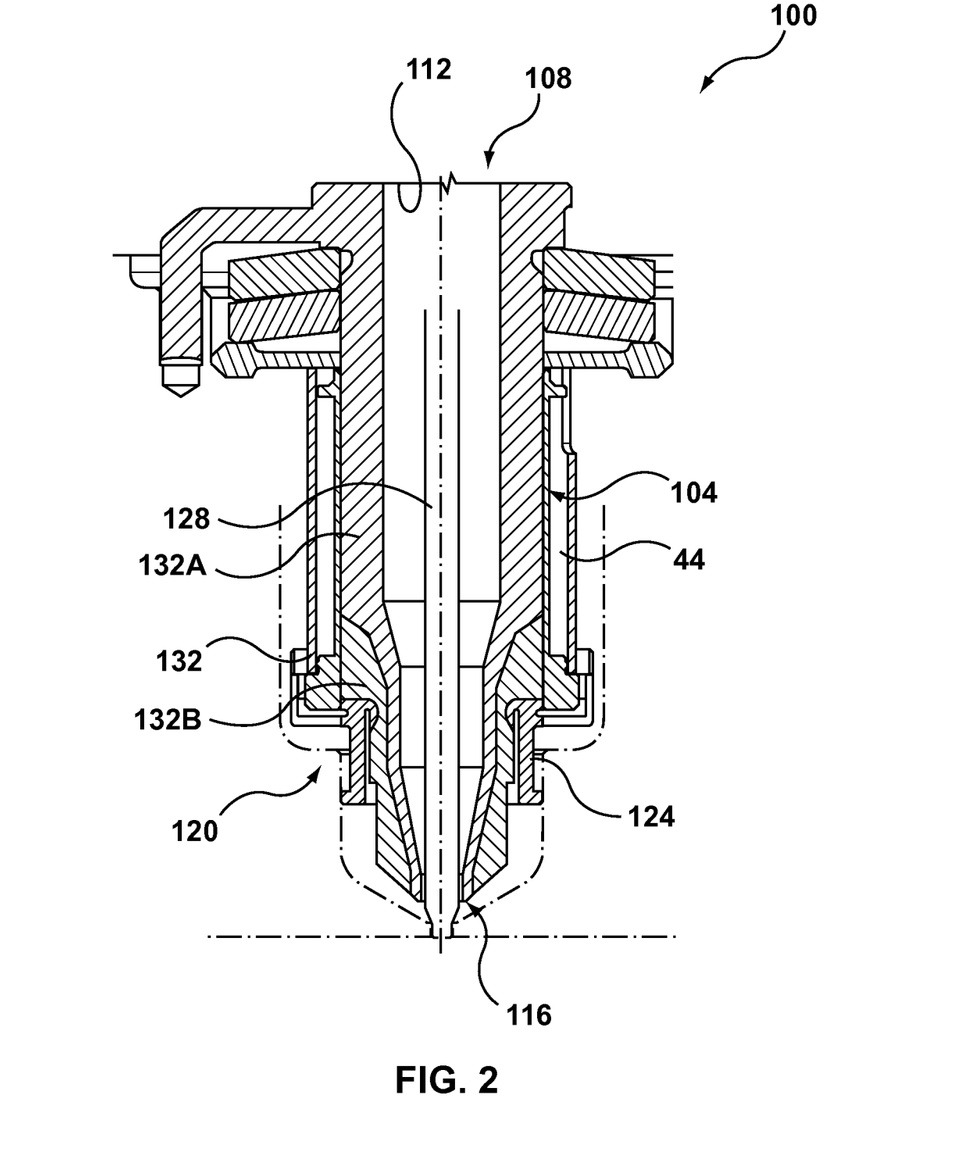
FIG. 2 is a perspective view of an injection molding nozzle according to an embodiment of the present invention.

FIG. 2 shows an exemplary embodiment of an injection molding nozzle 100 for use in a hot runner system, such as hot runner system 10. Nozzle 100 includes a nozzle body 104 that defines a melt channel 108 that extends from a melt entrance 112 to a melt exit 116. Toward a distal end of nozzle body 104 is a nozzle tip 120 that includes melt exit 116. Nozzle 100 also includes a sealing member 124 that is disposed proximate nozzle tip 120. During the use of nozzle 100, a valve stem 128 may extend through melt exit 116 and travel longitudinally within melt channel 108, opening and closing gate orifice 54.

In an exemplary embodiment, nozzle body 104 and nozzle tip 120 are integrally formed of multiple materials 132, with each of the materials 132 having a different material property such that the nozzle body and/or nozzle tip are functionally graded. The contrast between nozzle 100 and the nozzle 24 shown in FIG. 1 is easily seen as nozzle 100 does not have individually manufactured disparate components that are assembled by methods known in the art, such as the threaded engagement between nozzle body 40 and nozzle tip 42, or via press fitting, shrink fitting, welding, brazing, etc. By integrally formed, it is meant that the multiple materials are merged together in such a way so as to create a seamless unitary monolithic structure and is to be contrasted to a process that would join two or more disparate nozzle components via methods known in the art. Processes and methods for integrally forming components are described in more detail below, but in general an additive manufacturing process is used, such as when a first layer of material 132 is added to a second layer of the material or another material, which are solidified together, for example, in the presence of sufficient energy to fuse the two layers together. The functional grading of nozzle 100 permits multi-material components with optimized material properties, and/or reduces the number of manufacturing steps (press fitting, shrink fitting, welding, brazing, etc.) necessary to form nozzle 100 because the components, such as nozzle body 104, nozzle tip 120, and sealing member 124, are formed together.

In the exemplary nozzle 100 of FIG. 2, nozzle body 104 includes a first material 132A and a second material 132B, where the first material has a relatively higher strength than the second material and the second material has a relatively higher thermal conductivity than the first material. As shown, the first material 132A forms a substantial portion of the nozzle body, an inner portion of the nozzle tip 120, and sealing member 124. Second material 132B is disposed primarily within nozzle tip 120, radially outward from first material 132A. In this exemplary configuration, heat from a heater sleeve, such as heater sleeve 44 (also in FIG. 1), which ends prior to melt exit 116, may be transferred throughout the length of nozzle tip 120 by the second material 132B. The increased heat transfer assists in maintaining the temperature proximate melt exit 116, while the inclusion of first material 132A improves the abrasion resistance of the nozzle body 104 and nozzle tip 120, thereby extending the useful life of nozzle 100.

Figure 3:
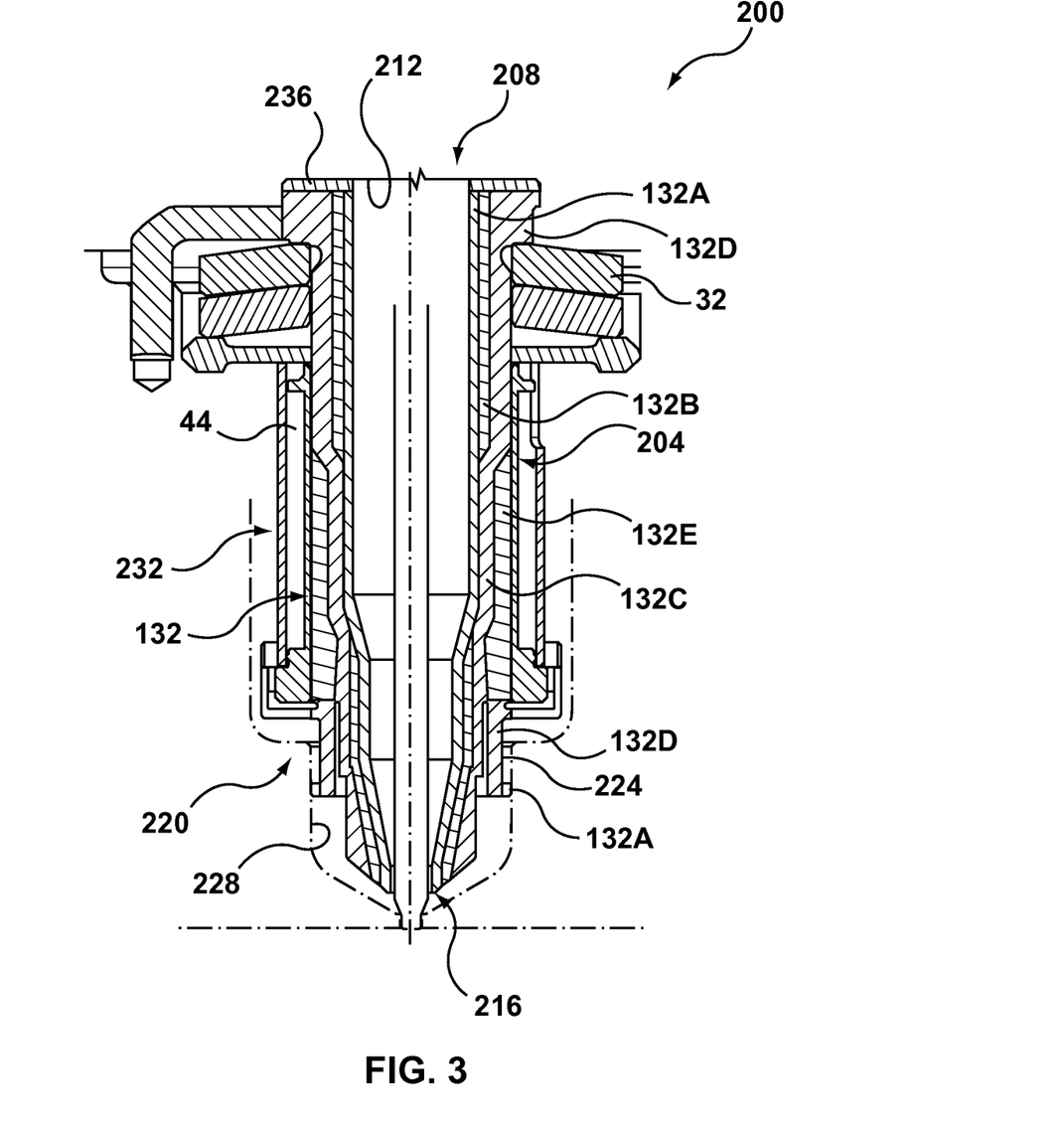
FIG. 3 is a perspective view of an injection molding nozzle according to another embodiment of the present invention.

FIG. 3 shows nozzle 200, a nozzle embodiment composed of multiple materials 132. Nozzle 200 includes a nozzle body 204 that defines a melt channel 208 that extends from a melt entrance 212 to a melt exit 216. Toward a distal end of nozzle body 204 is a nozzle tip 220 that includes melt exit 216. Radially outward from nozzle tip 220 is a sealing member 224. In this embodiment, nozzle body 204, nozzle tip 220, and sealing member 224 are integrally formed so as to form a unitary structure that is functionally graded to place materials with specific material properties at predetermined locations in nozzle 200.

As an example, and as shown in FIG. 3, nozzle 200 includes six different materials 132, i.e., first material 132A, second material 132B; a third material 132C, which is a fatigue strength material 132C; a fourth material 132D, which is an insulating material; a fifth material 132E, which is a relatively lower cost filler material; and a sixth material 132F, which is a galling resistance material. The position of materials 132 can be chosen and positioned so as to optimize the cost, function, and durability of nozzle 200. In an exemplary embodiment of nozzle 200, first material 132A is disposed on the at the periphery of melt channel 208 from about the melt inlet 212 to the melt outlet 216. At the top of nozzle body 108 and proximate the nozzle tip 220 is layer of second material 132B. Third material 132C is included in the nozzle body 104 and nozzle 220, proximate second material 132B, where the second material is disposed, and proximate first material 132A, where the second material is lacking. Sealing member 224 is primarily made up of fourth material 132D, with some of first material 132A being disposed at the edge of the sealing member that engages a gate insert 228. Fourth material 132D is also disposed near the top of nozzle body 204 proximate spring 32. Fifth material 132E can be included in relatively unimportant portions of nozzle 200, such as a middle portion 232 of nozzle body 204. Sixth material 132F is located on an end face 236 of nozzle body 204.

The functional grading of nozzle 200 permits multi-material components with optimized material properties, and/or reduces the number of manufacturing steps (press fitting, welding, brazing, etc). For example, the inclusion of sixth material 132F proximate manifold portion 22 (FIG. 1) reduces galling at the intersection of the manifold portion and nozzle 200 and thus extends the useful life of the nozzle. As another example, the inclusion of fifth material 132E reduces the overall cost of manufacture of nozzle 200. In yet another example, the use of third material 132C along the entire length of nozzle 200 improves the durability of the nozzle by improving it resistance to fatigue over the life of the nozzle. Although nozzle 200 includes six different materials, more or fewer materials may be included and may be positioned at alternate sites so as to meet predetermined design criteria for the nozzle.

Figure 4:
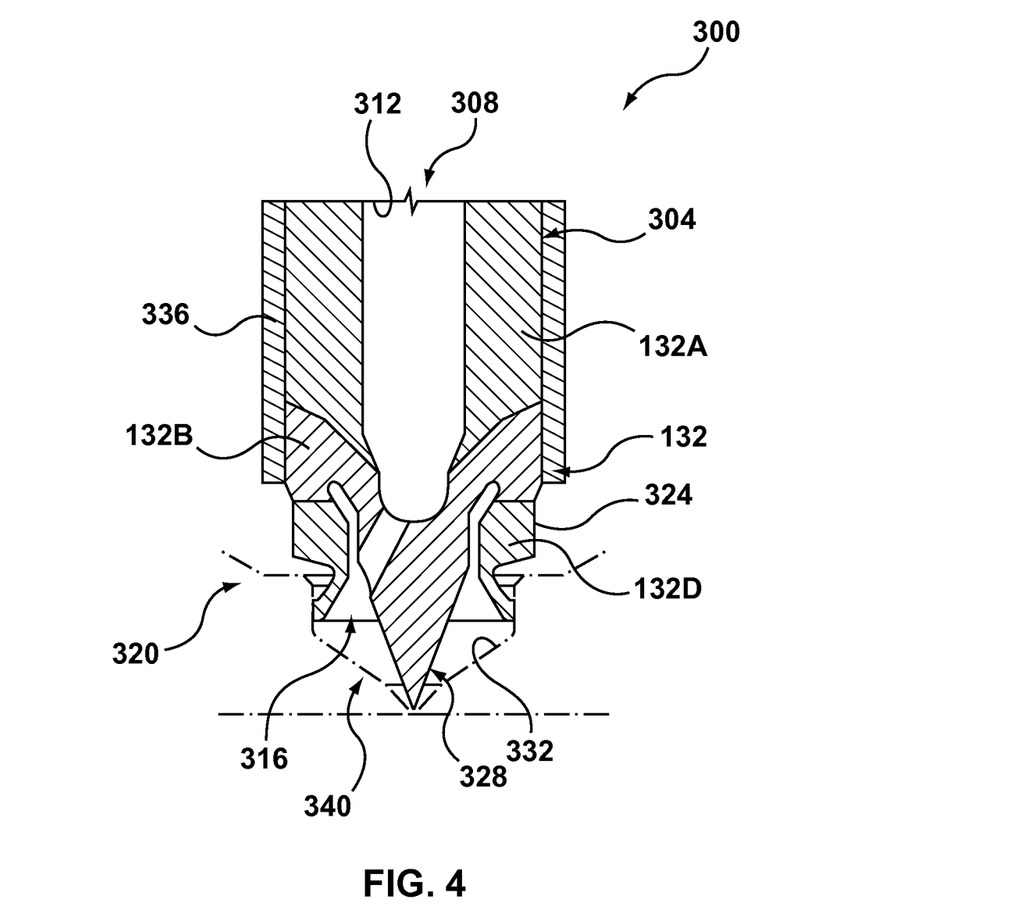
FIG. 4 is a perspective view of a portion of an injection molding nozzle according to yet another embodiment of the present invention.

FIG. 4 shows a portion of another functionally graded nozzle, nozzle 300. Nozzle 300 includes a nozzle body 304 that defines a melt channel 308 that extends from a melt entrance 312 to a melt exit 316. Toward a distal end of nozzle body 304 is a nozzle tip 320 that includes melt exit 316. Radially outward from nozzle tip 320 is a sealing member 324. At the end of nozzle tip 320 is a tip end 328 that is typically engaged with a gate insert 332 when a corresponding mold (not shown) is being filled with plastic melt. As with nozzle 200, nozzle 300 has a nozzle body 304, nozzle tip 320, and sealing member 324 that are integrally formed so as to be a unitary structure that is functionally graded to place materials with specific material properties at predetermined locations in the nozzle. As shown in FIG. 4, nozzle 300 includes three materials 132, i.e., first material 132A, second material 132B, and fourth material 132D, which are the same as the corresponding materials described above as having certain strategically selected properties/characteristics. First material 132A is disposed primarily in the nozzle body 304, but is also included on the surface of the tip end 328 so as to inhibit wear at the engagement point between gate insert 332 and the tip end 328. Second material 132B is distributed partially within nozzle body 304 and is the primary material of nozzle tip 320. Second material 132B may also be included in an upper portion of sealing member 324 to ensure uniform heat transfer from the heating sleeve 336 to melt disposed in melt channel 308. Most of sealing member 324 is composed of fourth material 132D, which resists heat transfer from the melt and heat sleeve 336 to gate insert 332. The configuration of materials 132 within nozzle 300 maintains the transfer of heat from heat sleeve 336 to the melt as the melt enters a melt exit region 340 and travels to the mold, thereby reducing the incidence of unwanted cooling of the melt prior to entering the mold.

Figure 5:
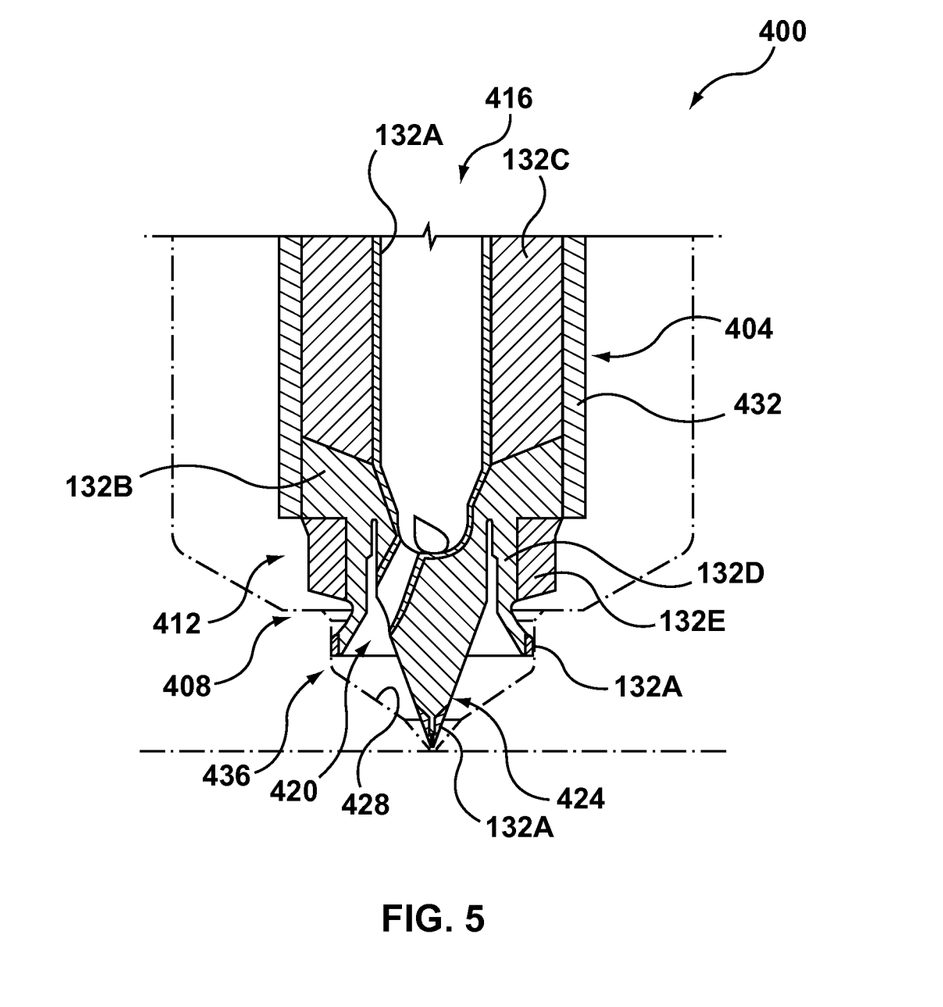
FIG. 5 is a perspective view of a portion of an injection molding nozzle according to still another embodiment of the present invention.

FIG. 5 depicts a portion of a nozzle 400 that includes a integrally formed nozzle body 404, nozzle tip 408, and sealing member 412. In this embodiment, nozzle 400 is composed of five different materials 132, i.e., materials 132A-E as described above. Surrounding a melt channel 416 and melt exit 420 is first material 132A, which limits wear induced by the travel of melt within the channel exit and the melt exit. First material 132A is also disposed at the end of sealing member 412 and at tip end 424 so as to provide abrasion resistance where the sealing member engages a gate insert 428. As shown in FIG. 5, first material 132A is disposed only in those zones where contact with gate mold 428 so as to minimize effects from the reduced heat carrying capability of the first material on the melt. Third material 132C is disposed between first material 132A and a heat sleeve 432 in nozzle body 404 and extends the useful life of nozzle 400 by improving its ability to resist fatigue caused by repetitive use. As with nozzle 300, discussed above, nozzle 400 includes second material 132B substantially throughout the nozzle tip 408 so as to promote heat transfer from heating sleeve 432 to a melt exit region 436 (proximate melt exit 420). Sealing member 412 is composed of forth material 132D and a fifth material 132E, with the fourth material being radially inward from the fifth material. Forth material 132D reduces heat transfer to the sealing member and thus assists in maintaining heat in melt region 436.

In an exemplary embodiment, materials 132 are provided, at least partially in powdered form. For example, and with reference to FIG. 2, first material 132A may be, at least partially, a first powdered metal alloy, and a second material 132B, may be, at least partially, a second powdered metal alloy. First material 132A and second material 132B can be fused to each other, by, for example, laser-light (as described in more detail below), with the first powdered metal alloy and the second powdered metal alloy, respectively, becoming solidified while subjected to the presence of laser light used to fuse the first material to the second material.

As mentioned above, first material 132A is a material with a relatively higher strength than some of the other materials that may be used to form one or more of the components of the nozzles described above. Exemplary first materials 132A include, but are not limited to, H13, 4140, and INCONEL® 718 steel (INCONEL® is a registered trademark of Special Metals Corporation, New Hartford, N.Y.).

Second material 132B is a material with a relatively higher thermal conductivity than the other materials that may be used to form one or more of the components of the nozzles described above. Materials that would be considered a second material 132B would have a thermal conductivity, expressed in W/(m·K), of greater than about 40. Exemplary second materials 132B include, but are not limited to, Beryllium Copper ($BeCU_3$) and Beryllium Copper ($BeCU_{25}$).

Third material 132C is a material with a relatively higher fatigue strength than some of the other materials that may be used to form one or more of the components of the nozzles described above. Exemplary third materials 132C include, but are not limited to, iron-based steel alloys, such as VASCOMAX® steel (VASCOMAX® is a registered trademark of ATI Properties, Inc., Albany, Oreg.), and martensitic alloy steel, such as AERMET® steel (AERMET® is a registered trademark of Carpenter Technology Corporation, Reading, Pa.).

Forth material 132D is an insulating material that has a relatively lower thermal conductivity than some of the other materials that may be used to form one or more of the components of the nozzles described above. Materials that would be considered a fourth material 132D would have a thermal conductivity of less than about 20. Exemplary fourth materials 132D include, but are not limited to, titanium and titanium alloys.

Fifth material 132E is a filler material that is typically a low cost material when compared with the other materials that may be used to form one or more of the components of the nozzles described above. Although many materials could be a filler material, exemplary fifth materials 132E include, but are not limited to most any steel.

Sixth material 132F is a material with a higher galling resistance than some of the other materials that may be used to form one or more of the components of the nozzles described above. Exemplary Sixth materials 132F include, but are not limited to, nitralloys D2 or S7.

A process that may be used to fabricate any of the nozzles or nozzle components described above is referred to generally as "additive manufacturing." At a high level, additive manufacturing uses, as inputs, design data for the nozzle component or nozzle, such as any of nozzles 100, 200, 300, and 400 of FIGS. 2 to 5, respectively, and builds a three-dimensional solid object, i.e., the nozzle, from the computer data. Exemplary additive manufacturing processes include, but are not limited to, powder bed or powder flow processes. Examples of powder bed processes include, but are not limited to, direct metal laser sintering (DMLS) process, sometimes also referred to by the terms selective laser sintering (SLS) process or selective laser melting (SLM) process, and electron beam melting (EBM). Examples of powder flow processes include, but are not limited to, laser engineered net shaping (LENS), direct metal deposition (DMD), and laser consolidation (LC).

Although other additive manufacturing processes may be used, such as those mentioned above, DMLS is a process that has proven to produce parts with high accuracy and detail resolution, good surface quality and excellent mechanical properties. In a typical implementation, the DMLS process fuses one layer of powdered metal to another layer of powdered metal, such as the fusing of multiple layers of first material 132A or fusing a layer of first material 132A and second material 132B to fabricate a nozzle. A metal powder is exposed to a focused laser beam, which fuses the metal powder into a solid part by locally melting the metal powder. The DMLS process involves using a three-dimensional computer aided design (CAD) that is used to implement the DMLS process. A technician works with the three-dimensional CAD model to properly orient the geometry for part building, and adds supports structure where appropriate. Once a build file is completed, the build file is sliced into the layer thickness. The machine is then programmed to build the designed part.

The DMLS process uses a high-powered laser to fuse the layers of metal powders together. Inside the build chamber area, there is a material dispensing platform and a build platform along with a recoater blade used to move new powder over the build platform. The technology fuses metal powder into a solid part by melting the metal powder locally using the focused laser beam. Parts are built up additively layer by layer, typically using 20 micron layers. This process allows for highly complex geometries to be created directly from the three-dimensional CAD data.

The aspects of size, feature details and surface finish, as well as print-through error in the Z axis may be factors that may be considered prior to the use of the DMLS process. However, by planning the build in the machine where most features are built in the X-axis and Y-axis as the material is laid down, the feature tolerances may be managed well. Surfaces usually have to be polished to achieve mirror or extremely smooth finishes. For production tooling, material density of a finished part may be addressed prior to use. In this process, metallic support structure removal and post processing of the part generated, is a time consuming process and may require use of EDM (Electrical Discharge Machining) and/or grinding machines having a similar level of accuracy provided by the DMLS process.

Figure 6:
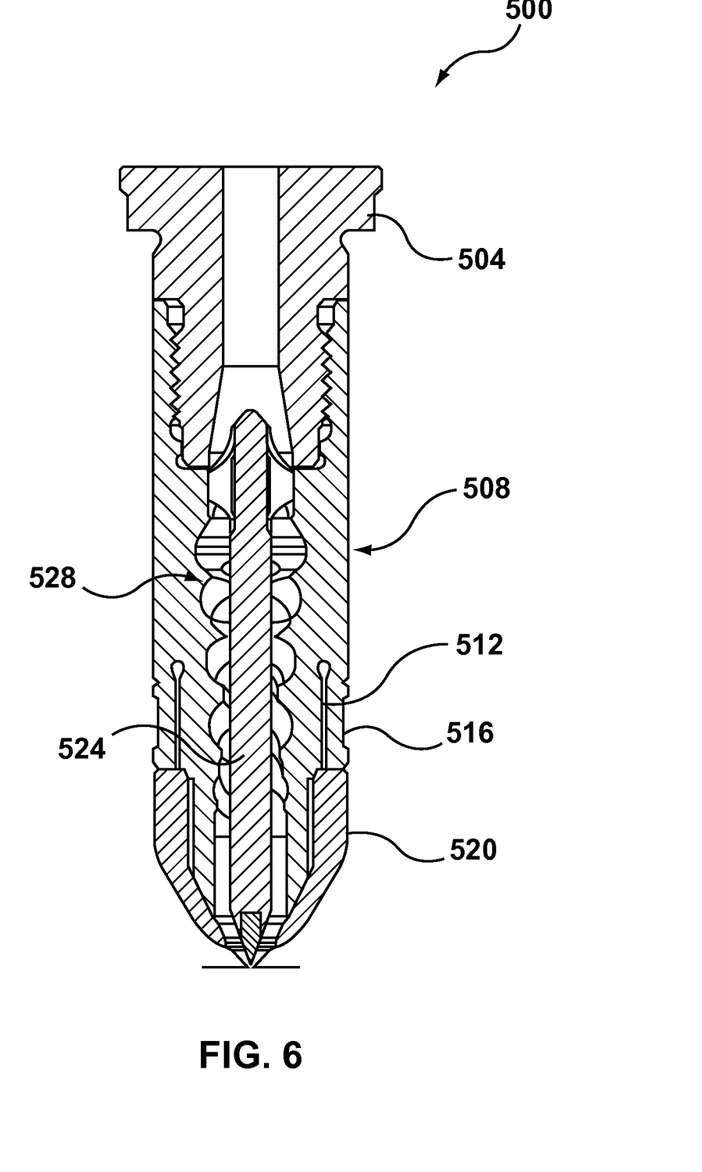
FIG. 6 is a perspective view of an injection molding nozzle having an exemplary internally complex geometry according to an embodiment of the present invention.

Another exemplary nozzle, nozzle 500, is shown in FIG. 6. Nozzle 500 includes a nozzle housing 504, nozzle body 508 integrally formed with nozzle tip 512, sealing member 516, tip insulator 520, and flow pin 524. In this embodiment, all of the components of nozzle 500 are made together with one another, as part of the same additive manufacturing process. However, as shown in FIG. 6, and as would be appreciated by a person of ordinary skill in the art, some of the components of nozzle 500 are separable. For example, flow pin 524 is capable of moving longitudinally within nozzle 500 and may be removed if a replacement is necessary. Nozzle housing 504 and tip insulator 516 may also be separable components, facilitating replacement or access to other components of nozzle 500.

Nozzle 500 may also have an integrally formed melt flow channel apparatus 528. As shown in FIG. 6 the melt flow channel apparatus 528 is disposed within nozzle body 504. An example of a melt flow channel apparatus 528 is a mixer.

The components of nozzle 500 may each be functionally graded to meet design requirements for each component. For example nozzle body 508 may be designed in accordance with the descriptions of nozzles 100, 200, 300, and 400 or any combination thereof.

Figure 7:
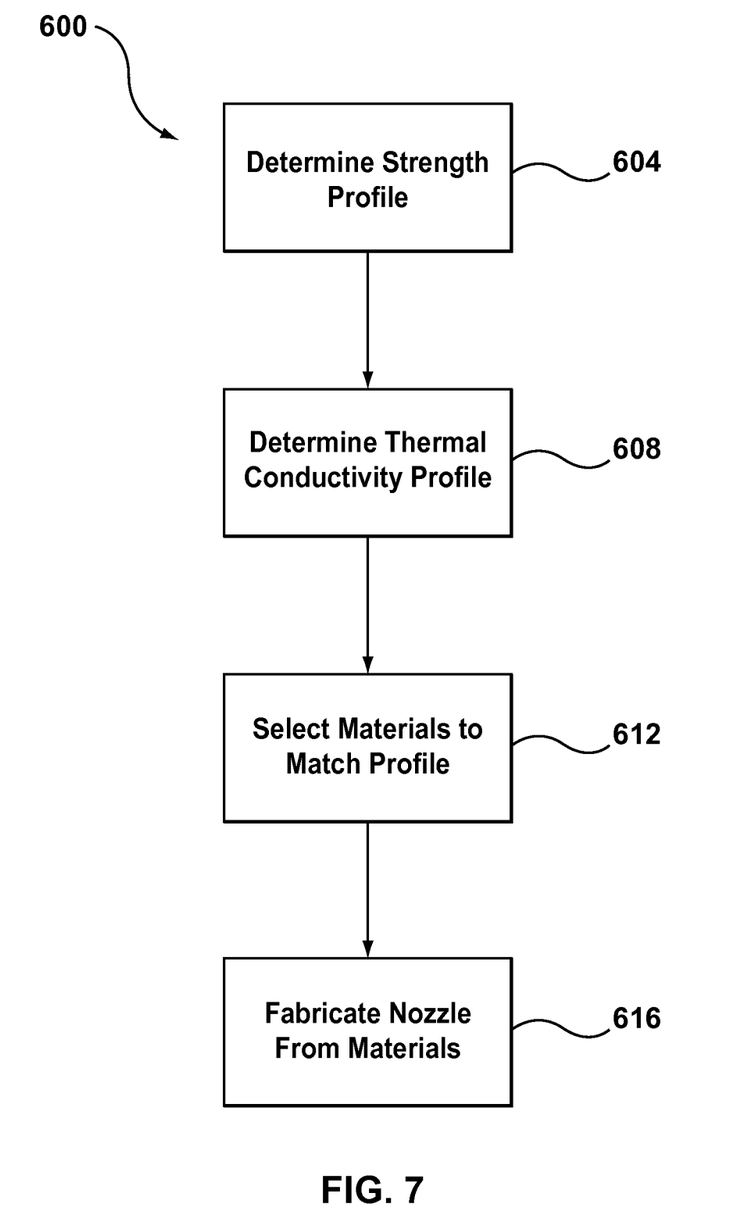
FIG. 7 is a block diagram of a method of forming an injection molding nozzle according to an embodiment of the present invention.

Turning now to FIG. 7, an exemplary process 600 for fabrication of an injection molding nozzle is shown. At step 604 a desired strength profile is determined. The strength profile is an analysis or depiction of where higher strength materials are desired at certain places within the nozzle. For example, and with reference to FIG. 2, the strength profile of nozzle 100 would be one in which a majority of nozzle body 104 and the periphery of melt channel 108 are relatively higher strength material, as is sealing member 124.

At step 608 a desired thermal conductivity profile is determined for the injection molding nozzle. The thermal conductivity profile is an analysis or depiction of where thermally conductive materials should be placed within the nozzle. For example, and with reference to FIG. 3, the thermal conductivity profile of nozzle 200 would be one in which one or more thermally conductive materials are placed in areas where improved transfer of heat from the heat sleeve is desired, such as near the top of nozzle body 204 and in nozzle tip 220.

At step 612 materials that can achieve the desired strength profile and the desired thermal conductivity profile are selected. Material selection can be based on a number of factors including cost, hardness, suitability for additive manufacturing processes, and heat transfer capabilities.

At step 616 an injection molding nozzle is fabricated as a integrally fused unitary structure composed of the plurality of materials determined in step 612 an in accordance with the desired strength profile determined in step 604 and the desired thermal conductivity profile and the thermal conductivity profile determined in step 616.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An injection molding nozzle assembly comprising:
   a nozzle body, the nozzle body partially defining a melt channel;
   a first material having a first characteristic, wherein the first material is disposed on a periphery of said melt channel, and wherein said first material is a wear resistant material; and
   a second material having a second characteristic, wherein said second material is disposed radially outward from said first material, and wherein said second material is a thermally conductive material, said second material being more thermally conductive than said first material, wherein said first material and said second material are integrally fused together so as to form a unitary structure.

2. An injection molding nozzle assembly according to claim 1, wherein said nozzle body is thermally graded from an interior surface of the nozzle body to an outer surface of the nozzle body.

3. An injection molding nozzle assembly according to claim 1, wherein said second material surrounding said first material.

4. An injection molding nozzle assembly according to claim 1, further including a second component, said second component being one of a nozzle housing, a nozzle tip, a sealing member, and a tip insulator, wherein said second component and the nozzle body are integrally fused together so as to form a unitary structure.

5. An injection molding nozzle assembly according to claim 1, further including a second component that is a nozzle tip, wherein said nozzle body and said nozzle tip are integrally fused together to form a unitary structure.

6. An injection molding nozzle assembly according to claim 5, further including a third component that is a sealing member, wherein said nozzle body, said nozzle tip, and said sealing member are integrally fused together to form a unitary structure.

* * * * *